Nov. 5, 1963   W. C. CRAMER   3,109,504
APPARATUS FOR FILLING CONTAINERS OF KNOWN VOLUME
IN TERMS OF THE SPECIFIC GRAVITY OF A LIQUID
Filed Feb. 27, 1959   2 Sheets-Sheet 1
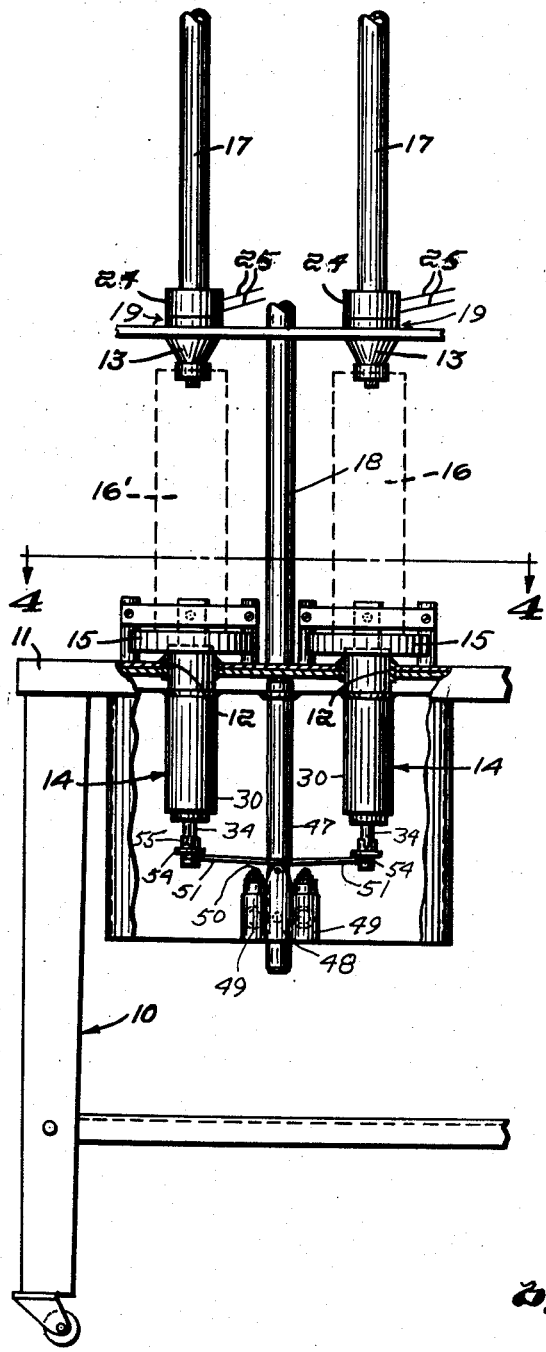
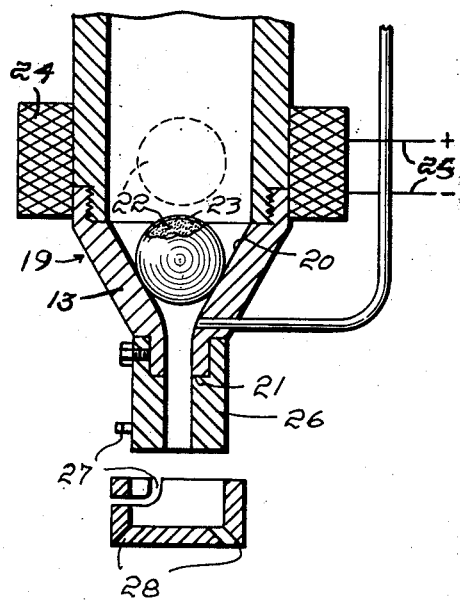
Inventor:
Ward C. Cramer,
by Abb Spear,
Attorney Nov. 5, 1963  W. C. CRAMER  3,109,504
APPARATUS FOR FILLING CONTAINERS OF KNOWN VOLUME
IN TERMS OF THE SPECIFIC GRAVITY OF A LIQUID
Filed Feb. 27, 1959  2 Sheets-Sheet 2
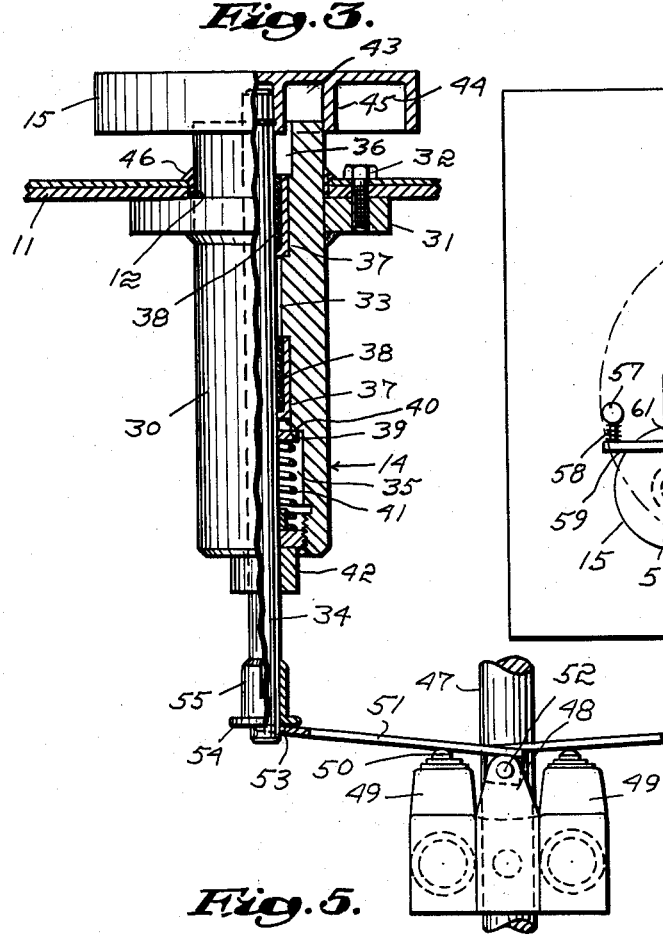
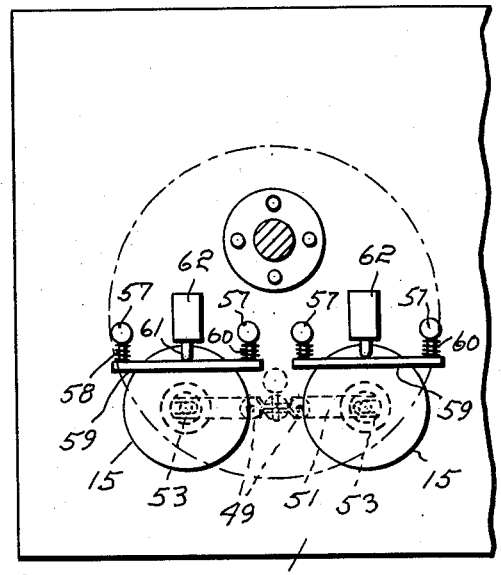
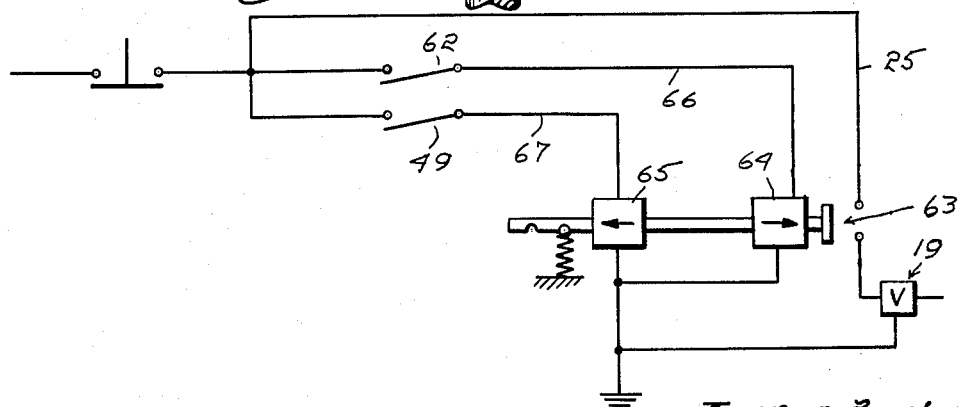
Inventor:
Ward C. Cramer,
by
Attorney

United States Patent Office 3,109,504
Patented Nov. 5, 1963

3,109,504
APPARATUS FOR FILLING CONTAINERS OF KNOWN VOLUME IN TERMS OF THE SPECIFIC GRAVITY OF A LIQUID
Ward C. Cramer, 81 Woburn St., Medford, Mass.
Filed Feb. 27, 1959, Ser. No. 796,078
3 Claims. (Cl. 177—73)

The present invention relates to apparatus for use in filling a container in terms of a wanted volume of a liquid measured by the weight of that volume of that liquid.

While the invention is adapted for use in the measuring of any predetermined volume of any liquid whose specific gravity is determinable, it is herein discussed primarily in connection with the filling of milk containers and particularly such that have plastic, cardboard, or other non-rigid walls making it impossible to measure their contents accurately by float controlled means.

Various attempts have been made to provide means for the measurement of milk within accurate limits in containers of the type above referred to. While some of these have proved reliable and accurate within acceptable limits, these have been relatively expensive and the present invention is concerned with apparatus in which structural simplicity is combined with a high degree of accuracy and flexibility in use.

In accordance with the invention, this general objective is attained by weight responsive means for supporting a container below a valve controlled delivery port and including a platform movable downwardly from an upper position into a position representing the "full" position of the container. The platform has a stem slidable in a supporting body against the action of a spring that balances a particular volume of a particular liquid in terms of the weight thereof so that like volumes of a liquid of the same specific gravity will result in the same platform and stem movement. This movement causes valve closing operation of the circuitry and the connection between it and the switch operating means thereof is adjustable to effect desired changes in the length of stem travel and, accordingly, corresponding changes in the delivered volume. While this adjustment may be used to compensate for variations in the specific gravity of the liquid, such adjustments may also be made by adjustments of the spring tension.

In the accompanying drawings, there is shown an illustrative embodiment of the invention from which these and other of its objectives, novel features, and advantages will be readily apparent. In the drawings:

FIG. 1 is a partly sectioned, fragmentary, side elevation of container filling apparatus in accordance with the invention, FIG. 2 is a partly sectioned, fragmentary view of the valve controlled delivery tip, FIG. 3 is a partly sectioned view, on an increased scale, of one of the weight responsive container supports, FIG. 4 is a section taken approximately along the indicated lines 4—4 of FIG. 1, and FIG. 5 is a somewhat schematic view of the electric valve operating circuitry.

In the embodiment of the invention shown in the drawings, a table, generally indicated at 10, has a top 11 provided with a pair of ports 12, each located below an appropriate one of the discharge nozzles 13 and having mounted therein a weight responsive device, generally indicated at 14, and including a platform 15 for an upwardly opening container 16. Each nozzle 13 is in a conduit 17 which may be an outlet of a tank or the end portion of a pump controlled delivery system. The nozzles 13 are shown as mounted on a standard 18 on the table 10.

Each nozzle 13 includes a generally indicated valve 19 shown as having an inwardly tapering seat 20, preferably of Teflon, nylon, or equivalent stock that is a non-conductor of electricity. The seat 20 has a port 21 closed by a ball 22 of magnetic stock but shown as provided with a non-conductive coat 23 such as neoprene. Above the seat 20, there is a coil 24 in a lead 25 and when the coil is energized, the ball 22 is lifted from its seat to permit the liquid to flow. When the coil 24 is de-energized, the ball 22 again seats to stop the flow. The seat 20 has a tip 26 connected thereto as by a bayonet joint indicated at 27 and provided with outwardly and forwardly inclined ports 28 disposed to direct the liquid against the side walls of the container 16 in a manner effectively preventing objectionable foaming.

Each weight responsive device 14 has a vertically disposed cylindrical body 30 disposed with its upper end extending through a table port 12 and having an annular flange 31 anchored to the under surface thereof as by bolts 32. The body 30 has an axial bore 33 for the stem 34 of the container supporting platform 15 and is counterbored at each end to provide chambers 35 and 36 and seats 37. The seats 37 receive the ball bearing assemblies 38 which ensures free axial movement of the stem 34.

The stem 34 has an annular shoulder 39 seated against the shoulder 40, defined by the junction of the counter bores forming the chamber 35 and the proximate seat 37, by a spring 41 held under suitable compression by the cap 42 threaded into the mouth of the chamber 35. The cap 42 may be employed to adjust the spring as required by the specific gravity of the liquid being measured.

The under surface of the platform 15 has annular recesses 43 and 44 to receive the exposed upper end of the body 30 and the flange anchoring bolts 32 when it moves downwardly into proximity to the table top. The recesses 43 and 44 define an annular web 45 engageable with an annular resilient cushion 46 surrounding the body 30.

A depending post 47 is secured to the undersurface of the table top 11 and this has a bracket 48 on which are mounted a pair of normally open switches 49, preferably microswitches, one for each stem 32, and having its actuator shown as being in the form of a stem 50 engaged by an arm 51 attached to the bracket 48 as by a pivot 52 and terminating in a fork 53 straddling the end of an appropriate one of the stems 34 to engage with the flange 54 of a cap 55 slidable thereon. The position of each cap 55 relative to its stem 34 enables the stem travel to be extended or shortened to effect the adjustment of the operation of the associated switch 49 as for effecting the delivery of a wanted volume of liquid.

Adjacent each platform 15 there is a pair of posts 57 each having a pair of forwardly disposed horizontal pins 58 slidably supporting a bar 59 for movement away from the platform 15 by a container 16 when placed thereon against the opposing action of springs 60. On such movement, the bar 59 engages the stem 61 of a normally open switch 62 thus to close it. The switch 62 is a microswitch of the type momentarily closed by such bar movement.

In practice, the operation of apparatus in accordance with the invention is effected by providing a switch 63 in the lead 25 to the valve opening coil 23. Relays 64 and 65 are provided and these are located in parallel leads 66 and 67, respectively. The lead 66 includes the appropriate switch 62 and the lead 67 includes the appropriate one of the switches 49. By this arrangement, the placing of a container 16 on a platform 15 results in the momentary closing of the associated switch 62 and in the opening of the appropriate delivery valve which remains in service until the weight of the container, when appropriately filled, causes the associated switch 49 to close. The relays 64 and 65 are indicated as being latched in their operative positions.

What I therefore claim and desire to secure by Letters Patent is:

1. In apparatus for filling a container by the weight of a wanted liquid volume, a fixed holder, a container platform including a stem slidably mounted in and extending through said holder for vertical movement downwardly from a predetermined upper position, an exposed holder end cap threaded to said holder, a spring interposed between said holder end cap and said stem yieldably maintaining said platform in said upper position, a switch having a normal first position and a second position, and a connection between said stem and said switch operable to move said switch from said first to said second position on predetermined downward movement of said stem, said connection including a switch actuating arm and a stem cap including an arm engaging portion whose axial relationship to the stem, establishes said predetermined movement.

2. In apparatus for filling a container by the weight of a wanted liquid volume, a fixed holder, a container platform including a stem slidably mounted in and extending through said holder for vertical movement downwardly from a predetermined upper position, a cap adjustably threaded to the lower end of said holder, a spring interposed between said cap and said stem yieldably maintaining said platform in said upper position, a switch having a normal first position and a second position and a connection between said switch and said stem for moving said switch from said first to said second position on predetermined downward movement of said stem.

3. In apparatus for filling a container by the weight of a wanted liquid volume, a fixed holder having a vertical bore, a container platform including a stem slidably mounted in and extending downwardly through said holder for vertical movement downwardly from a predetermined upper position, said stem including a shoulder, a cap threaded in the lower end of said bore, a spring interposed between said cap and said shoulder yieldably maintaining said platform in said upper position, a switch having a normal first position and a second position, and a sleeve member connected to the lower end of said stem for axial movement relative thereto, said sleeve member and said switch including interengaging portions.

References Cited in the file of this patent

UNITED STATES PATENTS

| | | |
|---|---|---|
| 196,434 | Chatillon | Oct. 23, 1877 |
| 410,886 | Gill | Sept. 10, 1889 |
| 753,718 | Lippincott | Mar. 1, 1904 |
| 954,302 | Johnstone | Apr. 5, 1910 |
| 1,060,677 | Gordon | May 6, 1913 |
| 1,270,170 | Kingsbury | June 18, 1918 |
| 1,481,282 | Cole | Jan. 22, 1924 |
| 1,531,007 | Jackson | Mar. 24, 1925 |
| 1,820,272 | Gumpper | Aug. 25, 1931 |
| 1,854,306 | Hapgood | Apr. 19, 1932 |
| 2,647,719 | Coates | Aug. 4, 1953 |
| 2,692,111 | Tacey | Oct. 19, 1954 |
| 2,828,935 | Ziegler et al. | Apr. 1, 1958 |